UNITED STATES PATENT OFFICE.

ALBERT WELLER, OF FRANKFORT-ON-THE-MAIN, GERMANY, ASSIGNOR TO VEREINIGTE CHININFABRIKEN, ZIMMER & CO., GESELLSCHAFT MIT BESCHRANKTER HAFTUNG, OF SAME PLACE.

CARBONIC ESTERS OF CINCHONA ALKALOIDS AND PROCESS OF MAKING SAME.

SPECIFICATION forming part of Letters Patent No. 625,075, dated May 16, 1899.

Application filed August 20, 1898. Serial No. 689,140. (No specimens.)

*To all whom it may concern:*

Be it known that I, ALBERT WELLER, a subject of the Emperor of Germany, and a resident of Frankfort-on-the-Main, Germany, have invented certain new and useful Improvements in Medical Compounds, of which the following is a specification.

I have produced chloro-carbonyl quinin by the action of phosgene gas on quinin according to the equation:

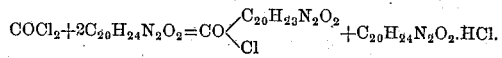

this being most conveniently effected in practice by allowing excess of phosgene to act on quinin. I have further found that by limiting the quantity of phosgene it is possible to obtain a preparation in which the second chlorin atom of the phosgene appears to be replaced by the quinin radical. For this purpose gaseous phosgene or phosgene dissolved in some convenient solvent is allowed to act on a double proportion of quinin, the quantity relations expressed by the equation:

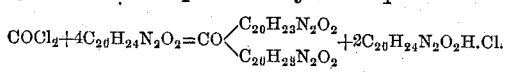

being adhered to as nearly as possible, or at most a slight excess of phosgene over the above proportion being employed. The new compound thus obtained can be referred to as "carbonic diquinin ester" or "carbonyl-quinin."

The following is a convenient method of performing the invention: One kilogram of anhydrous quinin is dissolved in four kilograms of chloroform, 76.4 grams of phosgene gas being passed into the cooled solution. The product of the reaction remains liquid, because quinin hydrochlorid produced by the reaction is also readily soluble in chloroform. In order to remove this substance, together with small quantities of quinin remaining unchanged, the product of the reaction is agitated with water containing one per cent. acetic acid until the extracts no longer taste bitter. The diquinin carbonic ether is then removed from the chloroform solution by agitation with water containing one per cent. sulfuric acid, small quantities of the chloro-carbonic ether of quinin, which is almost always produced, remaining dissolved in the chloroform. The new compound can be isolated from the sulfuric-acid solution by treatment with alkalies and agitation with ether, which is then evaporated or allowed to stand, depositing the substance in the form of white crystalline crusts, which may be purified by recrystallization from alcohol or benzene. Elementary analysis gave:

| Calculated for: $CO\!\!<\!\!{}_{C_{20}H_{23}N_2O_2}^{C_{20}H_{23}N_2O_2}$ | Found. |
|---|---|
| Carbon ...... 72.99% | 72.70% |
| Hydrogen .... 6.80% | 6.60% |

Carbonic diquinin ester melts at 186.5° centigrade and is insoluble in water and benzene and also in ether excepting when freshly precipitated by alkalies. It dissolves readily in alcohol, benzene, chloroform, and acids, reacts neutral, and is tasteless. It appears to be stable when boiled with water, but changes into quinin when heated with dilute alkalies or still more readily when warmed with acids and acid solution, undergoing this change even on standing. The sulfuric-acid solution shows a fluorescence of green-blue color. The compound does not give the herapathite reaction, but gives the thalleioquin reaction. With acids it yields well-characterized beautifully-crystalline salts, which frequently separate with water of crystallization. When dry, these salts are exceedingly stable, but are distinguished by the instability of their aqueous solutions, as already mentioned, yielding the corresponding salts of quinin on standing and still more readily on heating. The salts are obtained by the action of the corresponding acid on a molecular proportion of carbonic diquinin ester. Among others, the following have been prepared and analyzed: The neutral sulfate of the composition:

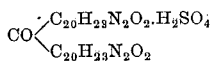

the neutral hydrochlorid and hydrobromid

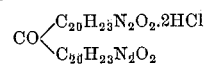

and

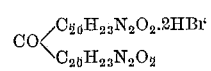

respectively, and the neutral and acid salicylates of the composition:

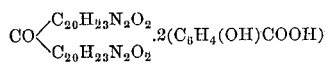

and

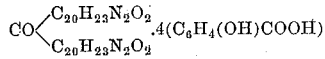

respectively. Carbonic diquinin ester and eventually its salts will find medical application. In an analogous manner the carbonic esters of other cinchona alkaloids—as, for instance, cinchonidin—may be prepared.

I claim—

1. The herein-described process of manufacturing carbonic esters of the cinchona alkaloids, which consists in reacting with phosgene upon a quantity of a cinchona alkaloid, so large that both chlorin molecules of the phosgene will be displaced with said cinchona alkaloid.

2. The herein-described process of manufacturing derivatives of the carbonic esters of the cinchona alkaloids, which consists in reacting with phosgene upon a sufficient quantity of a cinchona alkaloid, thereby displacing both the chlorin molecules of the phosgene, and adding an acid to form the corresponding salt.

3. The herein-described process of manufacturing carbonic diquinin ester, which consists in reacting with phosgene upon a sufficient quantity of quinin, thereby replacing both chlorin molecules of the phosgene with said quinin.

4. The herein-described process of manufacturing the neutral sulfate of carbonic diquinin ester, which consists in reacting with phosgene upon a sufficient quantity of quinin thereby displacing both chlorin molecules of the phosgene, and adding sulfuric acid.

5. The herein-described carbonic esters of the cinchona alkaloids, being insoluble in water and benzene, readily soluble in alcohol and acids, reacting neutral, tasteless, stable when boiled in water but reverting into the alkaloids when heated with dilute alkalies or acids, and having the general formula

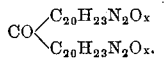

In testimony whereof I have signed my name to this specification in the presence of two subscribing witnesses.

ALBERT WELLER.

Witnesses:
WILHELM EITEL,
THEOPHIL REGELMANN.